United States Patent Office 3,538,407
Patented Nov. 3, 1970

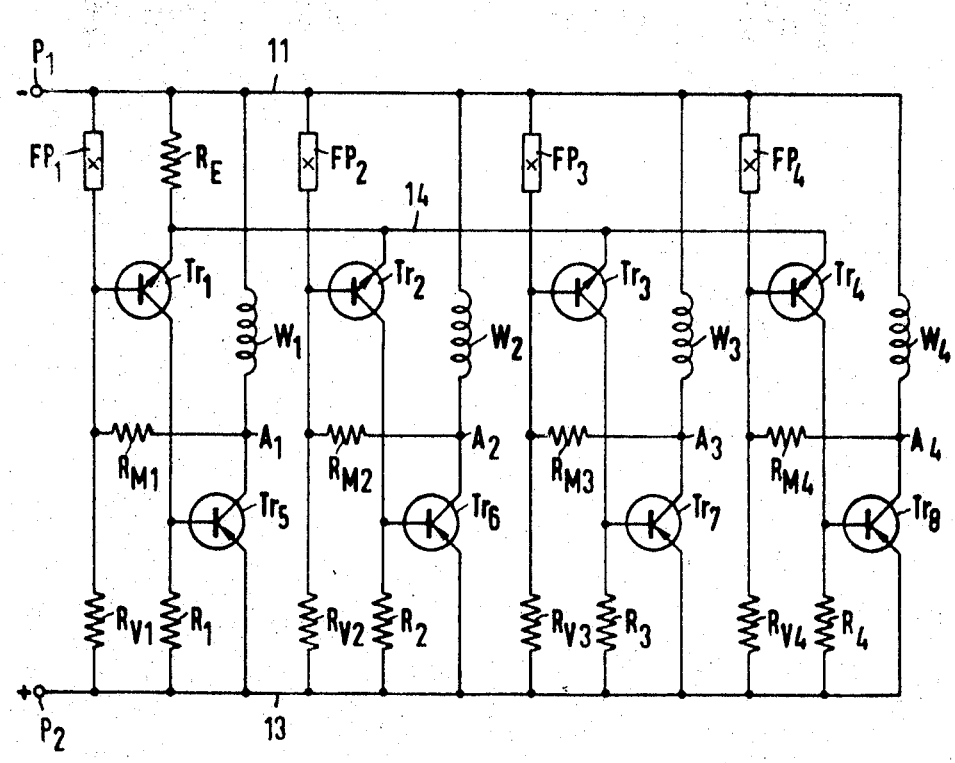

3,538,407
COMMUTATING CIRCUIT FOR A COMMUTATOR-LESS DC MINIATURE MOTOR
Jürgen Wenk, Erlangen, Germany, assignor to Siemens Aktiengesellschaft, a corporation of Germany
Filed Dec. 11, 1968, Ser. No. 782,902
Claims priority, application Germany, Dec. 15, 1967, 1,613,440
Int. Cl. H02k 29/00
U.S. Cl. 318—138                                                5 Claims

ABSTRACT OF THE DISCLOSURE

The base electrode of each of a plurality of power transistors is coupled to a common point in the connection between a galvanomagnetic resistor and a resistor of a corresponding one of a plurality of series circuit arrangements connected between the positive and negative polarity terminals of a source of DC voltage. Each base electrode is connected to each common point via a corresponding one of a plurality of transistors. Each of a plurality of stator windings of the motor is connected in series circuit arrangement with the emitter-collector path of a corresponding one of the power transistors between the terminals of the voltage source. A positive feedback resistor is connected between the collector electrode of each power transistor and the base electrode of a corresponding one of the transistors.

DESCRIPTION OF THE INVENTION

The present invention relates to a commutatorless or brushless DC miniature motor. More particularly, the invention relates to a commutating circuit for a commutatorless DC miniature motor.

The motor has a rotor which is permanently magnetized in radial or diametric directions. The rotor thus produces a magnetic field. The commutating circuit is controlled by galvanomagnetic resistors positioned in and influenced by the magnetic field produced by the rotor. The stator comprises a plurality of radially connected multiphase windings which are energized via transistors. Each of the galvanomagnetic resistors is related to a corresponding one of the stator windings and is connected in series circuit arrangement with a resistor of high resistance value. A common point in the connection between each galvanomagnetic resistor and the corresponding high resistance resistor is connected to the base electrode of a corresponding one of a plurality of power transistors. Each stator phase winding is connected in series circuit arrangement with the emitter-collector path of a corresponding one of the power transistors. Each of the series circuit arrangements is connected between the positive and negative terminals of a DC power source.

In order to provide highly efficient commutation of brushless DC motors of the type of the present invention, the switching transistors for the stator winding must be switched through up to saturation. Furthermore, the release of the current flow from one stator winding to the next must be as sharp or abrupt as possible and must occur at the proper instant.

The principal object of the present invention is to provide a new and improved commutating circuit for a commutatorless DC miniature motor.

An object of the present invention is to provide a commutating circuit for a commutatorless DC miniature motor, which circuit functions with efficiency, effectiveness and reliability.

An object of the present invention is to provide a commutating circuit for a commutatorless DC miniature motor, which circuit is of simple structure.

An object of the present invention is to provide a commutating circuit for a commutatorless DC miniature motor, which circuit commutates the motor at a high degree of efficiency.

In accordance with the present invention, a commutating circuit for a commutatorless DC miniature motor has a motor which produces a magnetic field and a stator having a plurality of windings. The commutating circuit comprises a plurality of galvanomagnetic resistors in the magnetic field. A source of DC voltage has a positive polarity terminal and a negative polarity terminal. A plurality of resistors each has a high resistance value. Each of the plurality of high resistance resistors is connected in series circuit arrangement with a corresponding one of the galvanomagnetic resistors between the terminals of the voltage source. A plurality of transistors each has emitter, collector and base electrodes. A plurality of power transistors each has emitter, collector and base electrodes and an emitter-collector path. The base electrode of each of the power transistors is coupled to a common point in the connection between the galvanomagnetic resistor and the resistor of a corresponding one of the series circuit arrangements via a corresponding one of the transistors. Each of the stator windings is connected in series circuit arrangement with the emitter-collector path of a corresponding one of the power transistors between the terminals of the voltage source. Each of a plurality of positive feedback resistors is connected between the collector electrode of a corresponding one of the power transistors and the base electrode of a corresponding one of the transistors.

Each of the transistors and each of the power transistors are complementary in type. Each of the stator windings is connected to the collector electrode of the corresponding one of the power transistors. The emitter electrodes of the transistors are connected in common to a terminal of the voltage source via a common emitter resistor.

In order that the present invention may be readily carried into effect, it will now be described with reference to the accompanying drawing, wherein the single figure is a circuit diagram of an embodiment of the commutating circuit of the present invention for a commutatorless DC miniature motor.

In the figure, four-phase stator windings $W_1$, $W_2$, $W_3$ and $W_4$ are electrically and spatially displaced from each other by 90°. The stator windings $W_1$, $W_2$, $W_3$ and $W_4$ are connected in common to the negative polarity terminal $P_1$ of a DC voltage source via a lead 11. The motor, which is a commutatorless or brushless DC miniature motor, comprises a permanent magnet rotor 12 which is magnetized radially or diametrically. The rotor 12 thus produces a magnetic field.

A plurality of galvanomagnetic resistors $FP_1$, $FP_2$, $FP_3$ and $FP_4$ are positioned in the magnetic field produced by the rotor 12 and are therefore controlled in accordance with the intensity of said magnetic field. Each of the galvanomagnetic resistors $FP_1$, $FP_2$, $FP_3$ and $FP_4$ may comprise, for example, a field plate. Each of the galvanomagnetic resistors $FP_1$, $FP_2$, $FP_3$ and $FP_4$ is provided for a corresponding one of the stator windings $W_1$, $W_2$, $W_3$ and $W_4$, so that the galvanomagnetic resistor $FP_1$ is provided for the stator winding $W_1$, and so on.

The galvanomagnetic resistor $FP_1$ is connected in series circuit arrangement with a resistor $R_{V1}$ having a high electrical resistance value between the negative and positive polarity terminals $P_1$ and $P_2$ of the DC voltage source. The galvanomagnetic resistor $FP_2$ is connected in series circuit arrangement with a resistor $R_{V2}$ having a high electrical resistance value between the negative and positive polarity terminals $P_1$ and $P_2$ of the DC voltage source. The galvanomagnetic resistor $FP_3$ is connected in series circuit arrangement with a resistor $R_{V3}$ having a high electrical resistance value between the negative and positive polarity terminals $P_1$ and $P_2$ of the DC voltage source. The galvanomagnetic resistor $FP_4$ is connected in series circuit arrangement with a resistor $R_{V4}$ having a high electrical resistance value between the negative and positive polarity terminals $P_1$ and $P_2$ of the DC voltage source.

A plurality of transistors $Tr_1$, $Tr_2$, $Tr_3$ and $Tr_4$ are provided. Each of the transistors $Tr_1$, $Tr_2$, $Tr_3$ and $Tr_4$ has emitter, collector and base electrodes and each is of NPN type. A plurality of power transistors $Tr_5$, $Tr_6$, $Tr_7$ and $Tr_8$ is provided. Each of the power transistors $Tr_5$, $Tr_6$, $Tr_7$ and $Tr_8$ has emitter, collector and base electrodes and an emitter-collector path. The base electrode of the transistor $Tr_1$ is connected to a common point in the connection between the galvanomagnetic resistor $FP_1$ and the resistor $R_{V1}$. The collector electrode of the transistor $Tr_1$ is connected to the base electrode of the power transistor $Tr_5$ and is connected to the positive polarity terminal $P_2$ of the DC voltage source via a resistor $R_1$ and a lead 13.

The base electrode of the transistor $Tr_2$ is connected to a common point in the connection between the galvanomagnetic resistor $FP_2$ and the resistor $R_{V2}$. The collector electrode of the transistor $Tr_2$ is connected to the base electrode of the power transistor $Tr_6$ and is connected to the positive polarity terminal $P_2$ of the DC voltage source via a resistor $R_2$ and the lead 13. The base electrode of the transistor $Tr_3$ is connected to a common point in the connection between the galvanomagnetic resistor $FP_3$ and the resistor $R_{V3}$. The collector electrode of the transistor $Tr_3$ is connected to the base electrode of the power transistor $Tr_7$ and to the positive polarity terminal $P_2$ of the DC voltage source via a resistor $R_3$ and the lead 13. The base electrode of the transistor $Tr_4$ is connected to a common point in the connection between the galvanomagnetic resistor $FP_4$ and the resistor $R_{V4}$. The collector electrode of the transistor $Tr_4$ is connected to the base electrode of the power transistor $Tr_8$ and to the positive polarity terminal $P_2$ of the DC voltage source via a resistor $R_4$ and the lead 13.

The emitter electrodes of the transistors $Tr_1$, $Tr_2$, $Tr_3$ and $Tr_4$ are connected in common to the negative polarity terminal $P_1$ of the DC voltage source via a lead 14, a common emitter resistor $R_E$ and the lead 11. Each of the power transistors $Tr_5$, $Tr_6$, $Tr_7$ and $Tr_8$ is of PNP type, so that the transistors $Tr_1$, $Tr_2$, $Tr_3$ and $Tr_4$ and said power transistors are complementary in type. The resistors $R_1$, $R_2$, $R_3$ and $R_4$ are utilized to discharge the collector and base residual currents of the corresponding transistors $Tr_1$, $Tr_2$, $Tr_3$ and $Tr_4$.

The stator winding $W_1$ is connected in series circuit arrangement with the emitter-collector of the power transistors $Tr_5$ between the negative and positive polarity terminals $P_1$ and $P_2$ of the DC voltage source, with the collector electrode of said power transistor connected to said stator winding. The stator winding $W_2$ is connected in series circuit arrangement with the emitter-collector path of the power transistor $Tr_6$ between the negative and positive polarity terminals $P_1$ and $P_2$ of the DC voltage source, with the collector electrode of said power transistor connected to said stator winding. The stator winding $W_3$ is connected in series circuit arrangement with the emitter-collector path of the power transistor $Tr_7$ between the negative and positive polarity terminals $P_1$ and $P_2$ of the DC voltage source, with the collector electrode of said power transistor connected to said stator winding. The stator winding $W_4$ is connected in series circuit arrangement with the emitter-collector path of the power transistor $Tr_8$ between the negative and positive polarity terminals $P_1$ and $P_2$ of the DC voltage source, with the collector electrode of said power transistor connected to said stator winding.

The utilization of complementary types of transistors as the transistors $Tr_1$, $Tr_2$, $Tr_3$ and $Tr_4$ and the power transistors $Tr_5$, $Tr_6$, $Tr_7$ and $Tr_8$ provides the advantage that a positive feedback may be obtained in a simple manner via single positive feedback resistor. This provides each switching stage with a bistable characteristic and permits each stage to be self-sufficient.

Thus, a positive feedback resistor $R_{M1}$ is connected between a common point $A_1$ in the connection between the stator winding $W_1$ and the collector electrode of the power transistor $Tr_5$ and the base electrode of the transistor $Tr_1$. A positive feedback resistor $R_{M2}$ is connected between a common point $A_2$ in the connection between the stator winding $W_2$ and the collector electrode of the power transistor $Tr_6$ and the base electrode of the transistor $Tr_2$. A positive feedback resistor $R_{M3}$ is connected between a common point $A_3$ in the connection between the stator winding $W_3$ and the collector electrode of the power transistor $Tr_7$ and the base electrode of the transistor $Tr_3$. A positive feedback resistor $R_{M4}$ is connected between a common point $A_4$ in the connection between the stator winding $W_4$ and the collector electrode of the power transistor $Tr_8$ and the base electrode of the transistor $Tr_4$.

In the operation of the commutating circuit of the present invention, when a phase winding is energized, the next-preceding phase winding is deenergized via a corresponding galvanomagnetic resistor, so that only a single stator winding conducts current.

If the galvanomagnetic resistor $FP_1$ is controlled by or subjected to a magnetic field, for example produced by a permanent magnet rotor or other suitable control device, its electrical resistance increases. The increase in resistance of the galvanomagnetic resistor $FP_1$ increases the base potential of the transistor $Tr_1$, so that said transistor is switched to its conductive condition. The power transistor $Tr_5$ is simultaneously switched to its conductive condition, also, due to the fact that the collector current of the transistor $Tr_1$ supplies the base electrode of said power transistor. The stator winding $W_1$ is thereby connected and energized, so that the transistor $Tr_1$ is provided with additional base current via the positive feedback resistor $R_{M1}$. This considerably accelerates the switching of the transistor $Tr_1$ and the power transistor $Tr_5$ and also drives said power transistor into saturation. The entire switching process thus requires initiation only by the galvanomagnetic resistor, and the connections are provided by the circuit.

When the galvanomagnetic resistor $FP_2$ is energized next in sequence, the transistor $Tr_2$ is switched to its conductive condition and switches the power transistor $Tr_6$ to its conductive condition. When the transistor $Tr_2$ is in its conductive condition, the emitter currents of both transistors $Tr_1$ and $Tr_2$ flow through the common emitter resistor $R_E$, so that a high voltage drop occurs across said resistor. Furthermore, since the galvanomagnetic resistor $FP_1$ then has a low electrical resistance, due to the controlling magnetic field, the base-emitter voltage required for switching the transistor $Tr_1$ to its conductive condition is not attained, so that the aforedescribed switching process via the positive feedback resistor $R_{M1}$ is reversed and the stator winding $W_1$ is disconnected and deenergized. The electromotive force at the common point $A_1$ relative to the negative polarity and produced in the stator winding $W_1$ due to the rotation of the rotor 12, also contributes to the switching operation via the positive feedback resistor $R_{M1}$.

It is thus seen that, by appropriate dimensioning, it is feasible that the galvanomagnetic resistors $FP_1$, $FP_2$, $FP_3$ and $FP_4$ will be required only for starting purposes. Thus, there is no need to depend upon the characteristics or behavior of the galvanomagnetic resistors or field plates $FP_1$, $FP_2$, $FP_3$ and $FP_4$ for the actual operation of the circuit. Furthermore, there is no limitation to a specific number of stator windings, since any suitable number of stator windings may be utilized.

While the invention has been described by means of a specific example and in a specific embodiment, I do not wish to be limited thereto, for obvious modifications will occur to those skilled in the art without departing from the spirit and scope of the invention.

I claim:

1. A commutating circuit for a commutatorless DC miniature motor having a rotor which produces a magnetic field and a stator having a plurality of windings, said commutating circuit comprising
    a plurality of galvanomagnetic resistors in said magnetic field;
    a source of DC voltage having a positive polarity terminal and a negative polarity terminal;
    a plurality of resistors each having a high resistance value and each connected in series circuit arrangement with a corresponding one of said galvanomagnetic resistors between the terminals of said voltage source;
    a plurality of transistors each having emitter, collector and base electrodes;
    a plurality of power transistors each having emitter, collector and base electrodes and an emitter-collector path, the base electrode of each of said power transistors being coupled to a common point in the connection between the galvanomagnetic resistor and the resistor of a corresponding one of the series circuit arrangements via a corresponding one of said transistors, each of the stator windings being connected in series circuit arrangement with the emitter-collector path of a corresponding one of said power transistors between the terminals of said voltage source; and
    a plurality of positive feedback resistors each connected between the collector electrode of a corresponding one of said power transistors and the base electrode of a corresponding one of said transistors.

2. A commutating circuit as claimed in claim 1, wherein each of said transistors and each of said power transistors are complementary in type.

3. A commutating circuit as claimed in claim 1, wherein each of said stator windings is connected to the collector electrode of the corresponding one of said power transistors.

4. A commutating circuit as claimed in claim 1, further comprising a common emitter resistor, and wherein the emitter electrodes of said transistors are connected in common to a terminal of said voltage source via said emitter resistor.

5. A commutating circuit as claimed in claim 1, wherein each of said transistors and each of said power transistors are complementary in type and wherein each of said stator windings is connected to the collector electrode of the corresponding one of said power transistors, and further comprising a common emitter resistor, and wherein the emitter electrodes of said transistors are connected in common to a terminal of said voltage source via said emitter resistor.

References Cited
UNITED STATES PATENTS

| | | | |
|---|---|---|---|
| 3,305,717 | 2/1967 | Weiss | 318—254 |
| 3,444,447 | 5/1969 | Newell | 318—138 |
| 3,448,359 | 6/1969 | Engel | 318—254 XR |

GLEN R. SIMMONS, Primary Examiner

U.S. Cl. X.R.

318—254

PO-1050 (5/69)

UNITED STATES PATENT OFFICE
CERTIFICATE OF CORRECTION

Patent No. 3,538,407      Dated November 3, 1970

Inventor(s) Jürgen Wenk

It is certified that error appears in the above-identified patent and that said Letters Patent are hereby corrected as shown below:

In the heading the German priority number should read as follows: --P 16 13 440.0--

SIGNED AND SEALED

JAN 19 1971

JAN. 19, 1971

(SEAL)
Attest:

Edward M. Fletcher, Jr.
Attesting Officer

WILLIAM E. SCHUYLER, JR
Commissioner of Patents